US006755999B2

(12) United States Patent
Su

(10) Patent No.: US 6,755,999 B2
(45) Date of Patent: Jun. 29, 2004

(54) METHOD OF MANUFACTURING A RELEASE-CONTROLLED PIPE

(76) Inventor: Shun-fua Su, 18F-3, No. 20-3, Lane 128, Section 3, Chung-kang Road, Taichung (TW)

( * ) Notice: Subject to any disclaimer, the term of this patent is extended or adjusted under 35 U.S.C. 154(b) by 424 days.

(21) Appl. No.: 10/050,093

(22) Filed: Oct. 29, 2001

(65) Prior Publication Data

US 2003/0080459 A1 May 1, 2003

(51) Int. Cl.[7] ................................................ B29C 44/20
(52) U.S. Cl. ........................................... 264/53; 264/41
(58) Field of Search ........................... 264/51, 53, 45.9, 264/177.1, 41, 177.18, 178 R, 204, 209.1, 209.3; 405/45

(56) References Cited

U.S. PATENT DOCUMENTS 4,517,316 A 5/1985 Mason
4,616,055 A * 10/1986 Mason ....................... 524/381
5,607,629 A * 3/1997 DeMello et al. ........... 264/45.9
6,398,997 B1 * 6/2002 Ligon et al. .................. 264/53

* cited by examiner

*Primary Examiner*—Michael Colaianni
*Assistant Examiner*—Barbara J. Musser
(74) *Attorney, Agent, or Firm*—Thomas M. Freiburger

(57) ABSTRACT

A release-controlled pipe and a related manufacturing method comprise several main steps, which are mixing a formulation, first hot melt extrusion and cooling, grinding into pieces, second hot melt extrusion, molding and cooling. The present invention includes the steps of first mixing elastomer pellets and a binder, then pouring the formulation into a melt extruder for extruding and shaping a rod-like extrudate. Then the rod-like extrudate is ground into pieces and placed into a water-filled container and another dry container. The mixture of dry ground pellets, wet ground pellets including water, and a small amount of lubricant is poured into a melt extruder for extruding, and a release-controlled pipe is shaped via a pipe die head and gathered by a winder after cooling.

2 Claims, 4 Drawing Sheets

10
20
23
23
23
21
21
22
24
261
25
25'
262
25

METHOD OF MANUFACTURING A RELEASE-CONTROLLED PIPE

BACKGROUND OF THE INVENTION

The present invention relates to a release-controlled pipe and a related manufacturing method, especially to a manufacturing process which improves the quality of a release-controlled pipe. The manufacturing process includes the following steps: formulation blending, first hot melt extrusion, stirring and shattering, second hot melt extrusion, and cooling. When the second hot melt extrusion is performed with ground pellets and water, the water serving as a vesicant, a uniform release-controlled pipe with good dispersion can be manufactured. Also, the cost of manufacturing and production can be reduced. In this way, the present invention constitutes a practical advancement which will be beneficial to the industry.

Release-controlled pipes have many applications, especially in agriculture. Manufacturing of a release-controlled pipe is not an easy matter, such as shown in U.S. Pat. No. 4,517,316 and in FIG. 1 herein. The referenced patent relates to a common manufacturing process for a release-controlled pipe, which mainly includes the following steps. First, the formulation is blended and shattered, then it is extruded via a compounding extruder. After water cooling is performed, pellets of the compounds are dried on a conveyor and then bagged. Then the pellets of the compounds are poured into a second extruder. After being heated to the molten temperature via three successive heating devices, the pellets are extruded to form release-controlled pipes, then cooled and gathered.

Using the release-controlled pipe produced from the foregoing manufacturing process may result in the following disadvantages:

1. The commonly used manufacturing process includes many steps, and requires many mechanical devices, so the cost is high.
2. The amount of dispersion of release-controlled pipes depends upon the number of gas holes. Therefore, for a release-controlled pipe to have good dispersion, except for the formulation, the water content during formulation and extrusion molding is important. However, the amount of water content in the formulation of the commonly used manufacturing process is not easily controlled, resulting in a low quality release-controlled pipe.

SUMMARY OF THE INVENTION

The first purpose of the present invention is to provide a simpler, less expensive manufacturing process of a release-controlled pipe.

The second purpose of the present invention is to provide a release-controlled pipe with better dispersion, which has better soaking and dispersing effects.

The third purpose of the present invention is to provide a new method for industry use that can be free of unessential components or mechanical devices in the manufacturing process, and can also improve the quality of a release-controlled pipe.

A related manufacturing method for a release-controlled pipe which can achieve the purposes described above comprises the following steps: mixing a formula, first compounding extrusion, cooling, grinding into pieces, blending, secondary extrusion molding and cooling, then gathering the pipe. The dry, ground pellets obtained immediately after the first compounding extrusion step, mixed with pellets including water content, using water as a blowing agent, undergo secondary hot melt extrusion. The quality of the release-controlled pipe is improved with the above manufacturing method.

DESCRIPTION OF THE DRAWINGS

The drawings disclose an illustrative embodiment of the present invention that serves to exemplify the various advantages and objects hereof, and are as follows.

DESCRIPTION OF PREFERRED EMBODIMENTS

Figure 1:
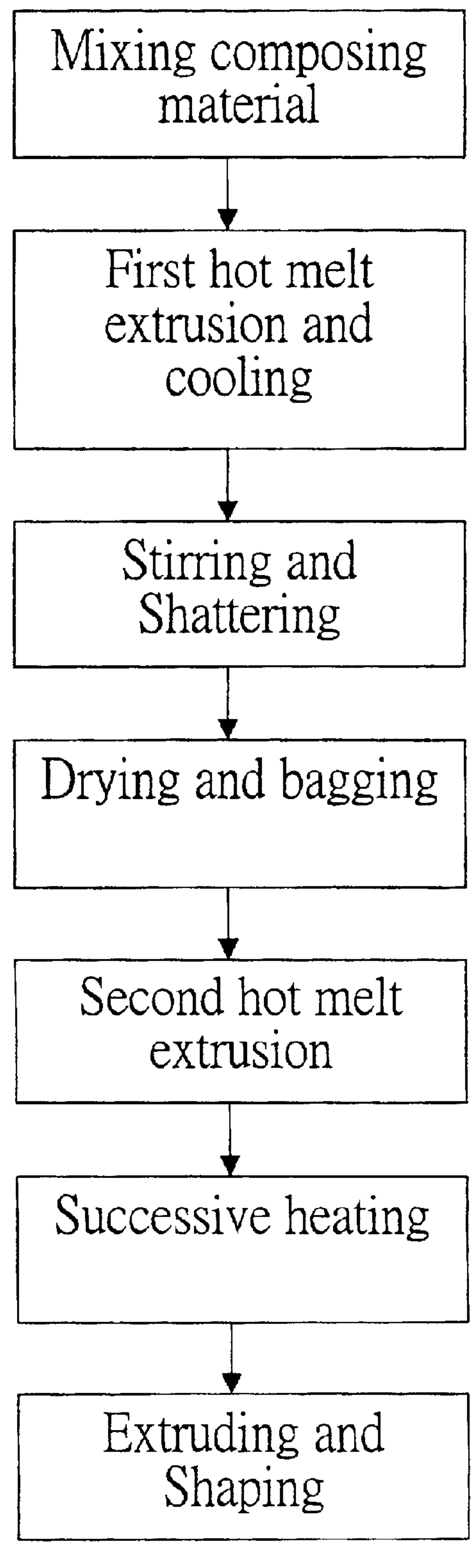
FIG. 1 is a flow chart of the manufacturing process of the commonly used method for producing release-controlled pipes.
Figure 2:
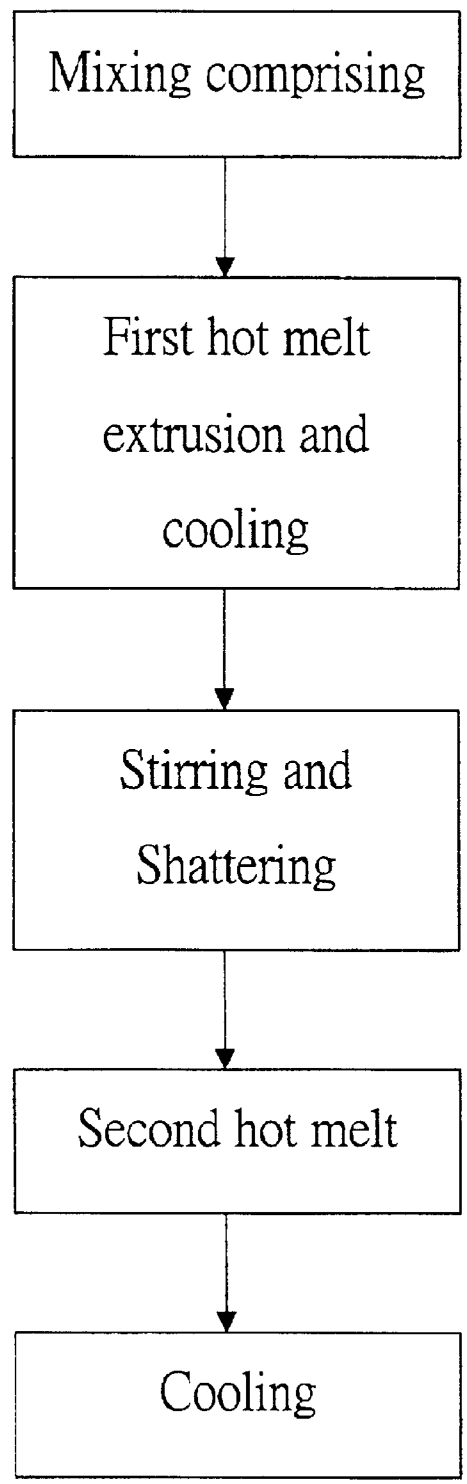
FIG. 2 is a flow chart of the manufacturing process of the release-controlled pipe of the present invention.
Figure 3:
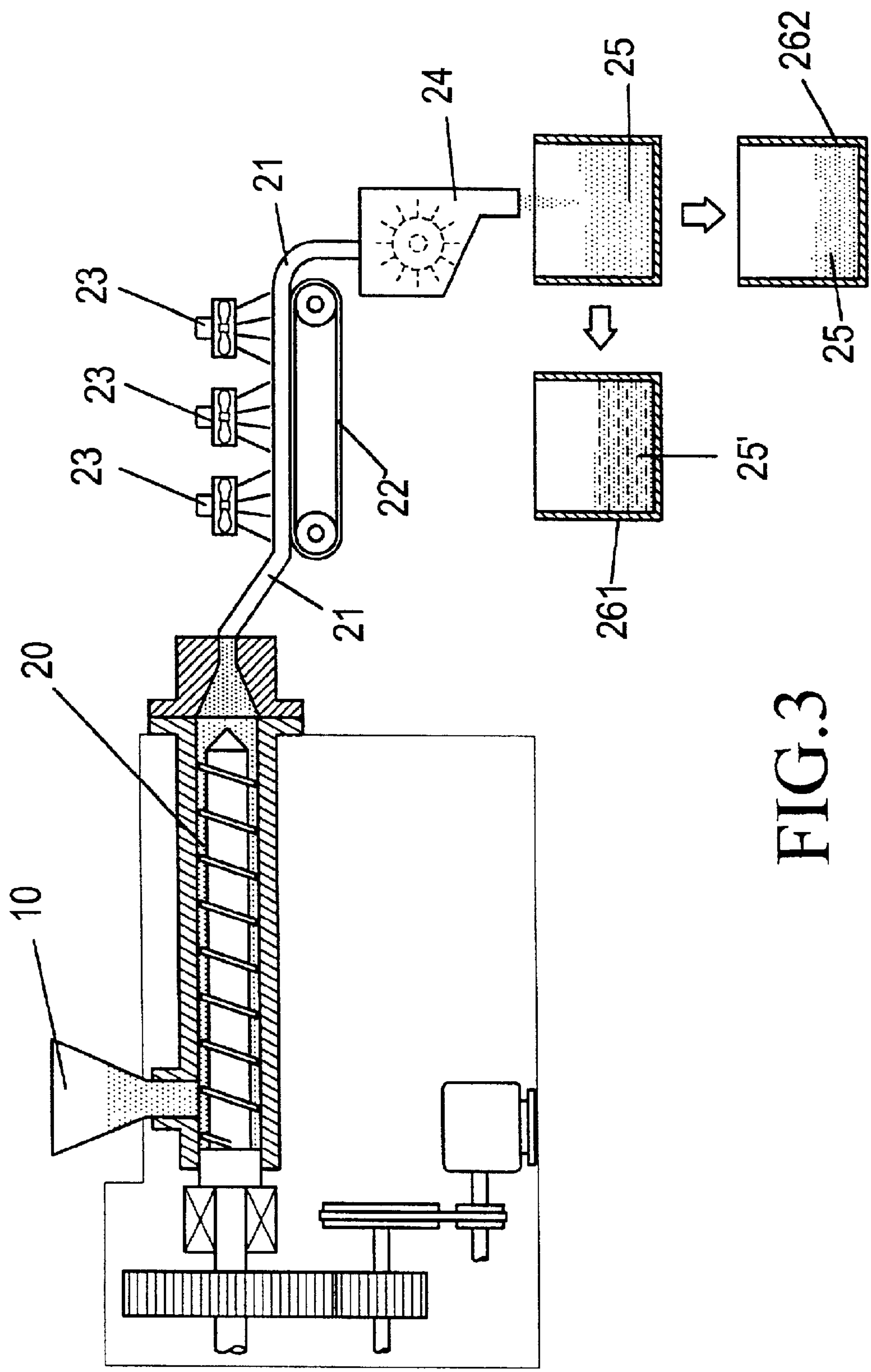
FIG. 3 is a process diagram showing the manufacturing method of the release-controlled pipe during the first hot melt extrusion.
Figure 4:
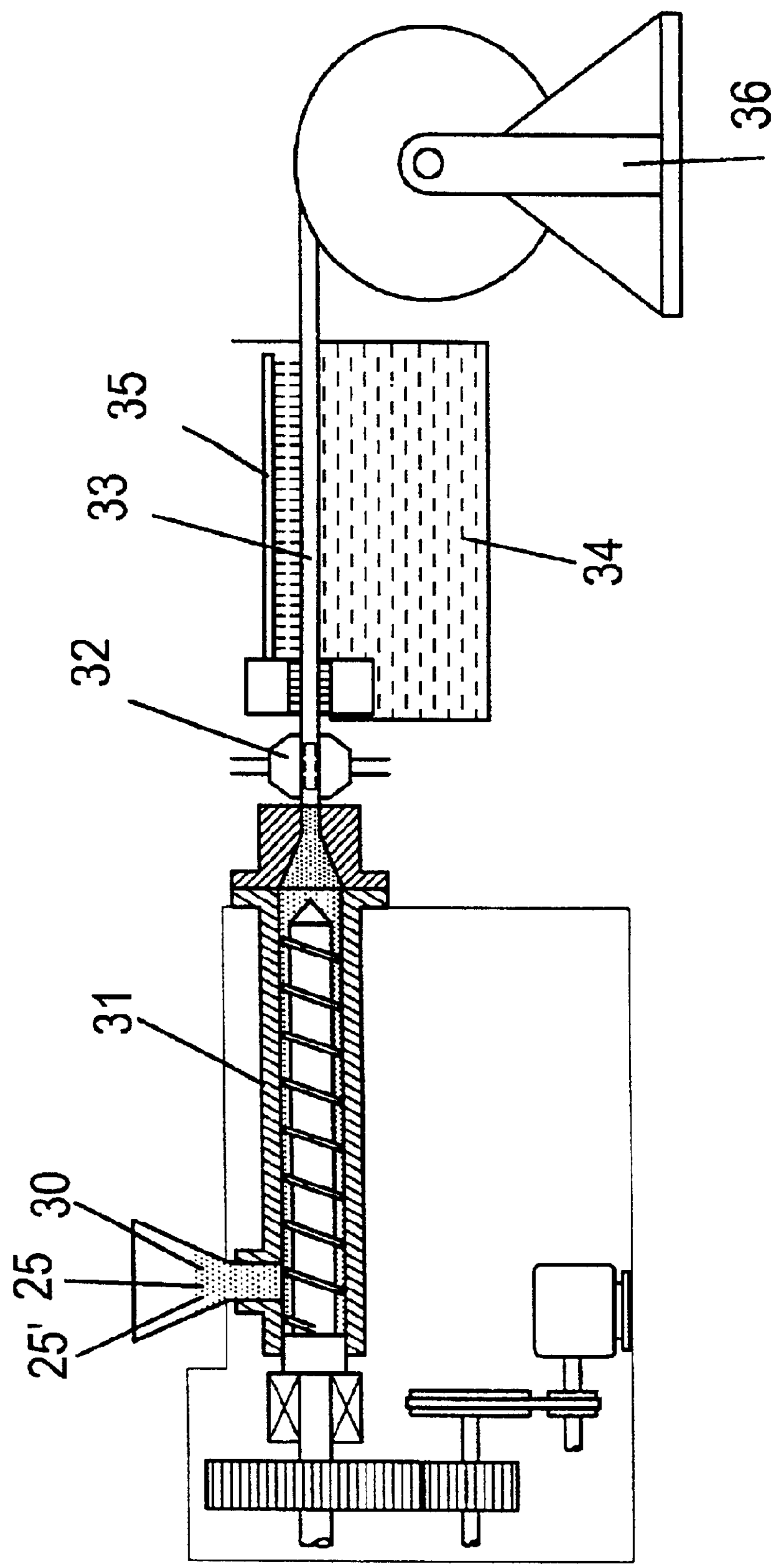
FIG. 4 is a process diagram showing the manufacturing method of the release-controlled pipe during the second hot melt extrusion.

As shown in FIGS. 2 and 3, the manufacturing method of the present invention comprises mainly the following steps:

1. Formulation Blending: Elastomer pellets and binder are mixed to form a formulation 10, wherein the elastomer pellets occupy 60 to 80 percent and can be rubber material such as waste tires while the binder occupies 40 to 20 percent and can be resins of High-density PE, Low-density PE, Linear-low-density PE, etc.;
2. First Hot Melt Compounding Extrusion: The formulation 10 is poured into the hopper of an extruder 20 to extrude a rod-like extrudate 21, then passes through the conveyor 22 and cooling unit 23 for cooling;
3. Grinding and Blending: The rod-like extrudate is ground via a granulator 24, and then placed into a water-filled container and a dry container. The rod-like extrudate 21 is put into the granulator 24 to be cut into small pieces, and then the ground pellets 25 are put into a water-filled container 261 and a dry container 262, where the ground pellets 25' are soaked in the water-filled container 261 for at least one day;
4. Secondary Hot Melt Molding Extrusion: As shown in FIG. 4, a mixture of the ground pellets 25, the ground pellets 25' soaked in water, and a small amount of the lubricant 30 are poured into a melting extruder 31 for extruding, then a release-controlled pipe 33 is shaped by means of a pipe die head 32;
5. Cooling: The release-controlled pipe 33 extruded by means of the pipe die mold 32 is cooled, forming a uniform shape through a water tank 34 and a sprayer 35, then is wrapped around a winder 36.

Compared to the foregoing quoted case and other commonly used technologies, a release-controlled pipe and the related manufacturing method of the present invention have advantages as follows:

1. The steps of the present invention are simpler than the manufacturing process of the commonly used technologies because the present invention eliminates three heating devices and related drying steps. Also, labor and other costs are reduced.

2. The present invention uses the ground pellets including the water content 25' along with the ground pellets 25, and uses the water content to be a vesicant for the hot melt extrusion. In this way, the foaming effect can be improved to make gas holes disperse uniformly on the whole release-controlled pipe 33. Also, the size and number of gas holes can be controlled by the amount of the ground pellets with water content 25' that is poured into the melt extruder.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claim.

What is claimed is:

1. A method for manufacturing a release-controlled pipe which mainly comprises a plurality of steps which are:

Mixing a plurality of elastomer pellets and a binder, wherein said elastomer pellets comprise 60 to 80 percent of the mixture and can be rubber material such as waste tires, and wherein said binder comprises 40 to 20 percent of the mixture and can be resin material;

Pouring said formulation into a first melt extruder to form a rod-like extrudate, and then cooling said rod-like extrudate being cooled through a conveyor and a cooling unit;

Grinding said rod-like extrudate into pellets, then placing a portion of the pellets into a water-filled container and another portion of the pellets into a dry container thus producing dry ground pellets and wet ground pellets for collecting separately;

Mixing dry ground pellets and wet ground pellets which were soaked in water, with a small amount of lubricant such as stearic acid, and pouring the mixture into a secondary hot-melt extruder and using a pipe die head to extrude and shape a release-controlled pipe;

Cooling the extruded release-controlled pipe with water to fix the shape of the pipe, and then gathering the pipe using a winder.

2. A method for manufacturing a release-controlled pipe as recited in claim 1, wherein said ground pellets are soaked in said water-filled container for more than one day.

* * * * *